United States Patent [19]
Moore

[11] Patent Number: 5,353,208
[45] Date of Patent: Oct. 4, 1994

[54] HIGH INTENSITY COMPACT FLASHLIGHT

[76] Inventor: Larry Moore, 211 Jennifer La., P.O. Box 70, Cottonwood, Ariz. 86326

[21] Appl. No.: 997,881

[22] Filed: Dec. 29, 1992

[51] Int. Cl.$^5$ ............................................. F21L 7/00
[52] U.S. Cl. ................................... 362/202; 362/208
[58] Field of Search .............. 362/189, 200, 202, 208

[56] References Cited

U.S. PATENT DOCUMENTS

| | | | |
|---|---|---|---|
| 700,650 | 5/1902 | Hubert | 362/208 |
| 998,895 | 7/1911 | Harvey | 362/200 |
| 2,278,614 | 4/1942 | James | 362/157 |
| 3,124,306 | 3/1964 | Schotz | 362/200 |
| 4,203,150 | 5/1980 | Shamlian | 362/202 |
| 4,285,031 | 8/1981 | Reiss | 362/202 |
| 4,443,833 | 4/1984 | Frazzina | 362/202 |
| 4,480,295 | 10/1984 | Shuster | 362/189 |
| 4,623,957 | 11/1986 | Moore et al. | 362/200 |
| 4,644,451 | 2/1987 | Chabria | 362/200 |
| 4,709,309 | 11/1987 | Yamaki | 362/202 |
| 4,754,378 | 6/1988 | Chen | 362/200 |

*Primary Examiner*—Richard A. Bertsch
*Assistant Examiner*—Michael Kocharov

[57] ABSTRACT

A very compact flashlight having an external diameter and length comparable to a typical single AA cell flashlight, but with much higher emitted light intensity, is described. The flashlight fits into pre-existing mounts designed to attach AA cell flashlights to weapons (e.g., pistols) for target illumination. It is shorter than multi-cell AA flashlights and brighter than single cell AA flashlights, thereby providing better weapon target illumination without the bulk associated with prior art multi-cell units. The flashlight barrel is shaped to accommodate a bundle of, for example, three AAAA batteries arranged in a side-by-side relationship. Circuit boards located at opposite ends of the battery bundle interconnect the batteries in series so that higher voltage, higher intensity lamps can be used. Alignment means inside the barrel hold the batteries and circuit boards in a predetermined relationship to accomplish the series interconnection. A high-intensity bi-pin lamp is conveniently coupled to one of the circuit boards and a switch for integral or remote operation is coupled to the other circuit board.

17 Claims, 5 Drawing Sheets

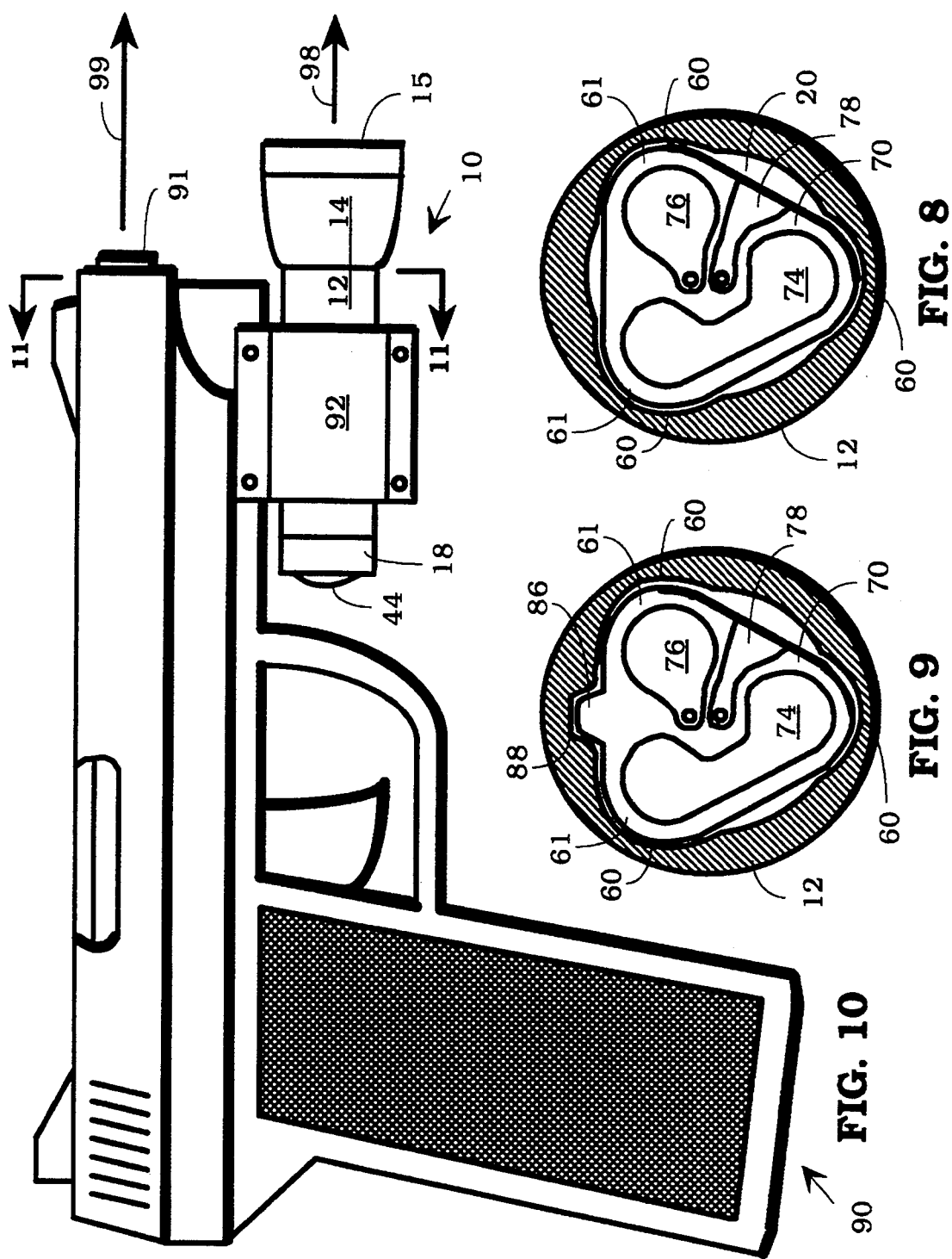

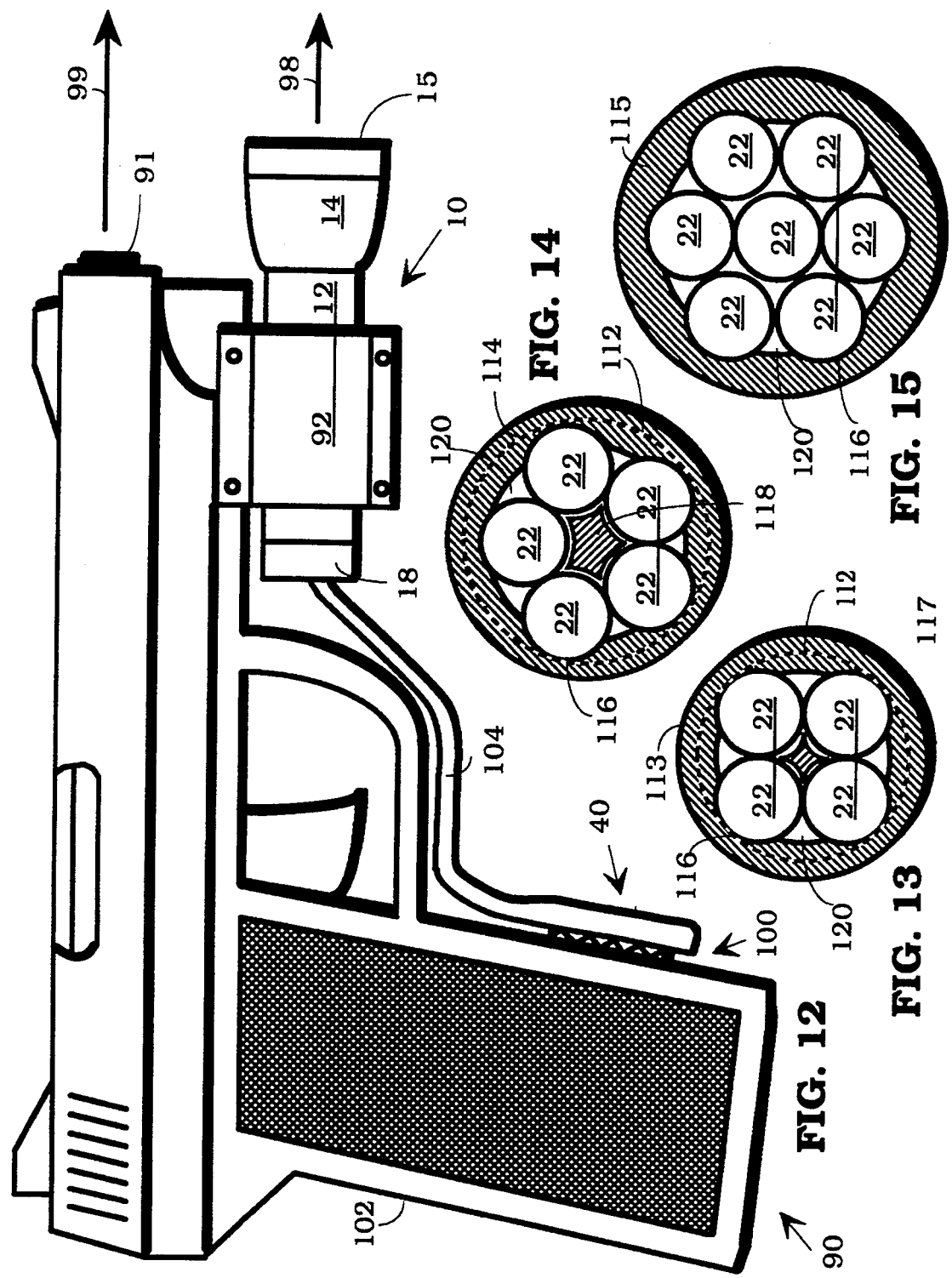

5,353,208

HIGH INTENSITY COMPACT FLASHLIGHT

FIELD OF THE INVENTION

This invention relates primarily to flashlights and, more particularly, to a miniature flashlight adapted to be hand-held or mounted on a weapon for target illumination.

BACKGROUND OF THE INVENTION

Flashlights in general are well known in the prior art, as for example, those described in U.S. Pat. Nos. 4,577,263, 4,658,336, 4,788,631, 4,851,974, 4,888,670, 4,899,265, 4,942,505 and 5,124,898 which are incorporated herein by reference. Flashlights and mounting systems specifically adapted to be used with firearms are also well known, as for example, those described in U.S. Pat. Nos. 1,088,502, 2,017,585, 2,085,732, 4,542,447, 4,627,183, 4,697,226 and 4,876,816 which are also incorporated herein by reference.

Illumination intensity and flashlight size generally go hand in hand, that is, the larger the flashlight, the higher the illumination intensity that can usually be achieved. This is because larger and more numerous batteries provide higher current and voltage and are thereby able to more readily energize higher intensity lamps which give brighter light. At the other extreme, very compact prior an flashlights generally do not contain batteries with sufficient voltage and/or current to energize high intensity bulbs and, hence, the illumination they provide is comparatively weaker.

It is desirable that flashlights used for target illumination have the highest possible illumination intensity. This is because weapons are often used under adverse conditions and the brighter the target illumination, the more clearly the details of the target can be seen. This is important because of the well known property of the human eye that the amount of detail that can be seen (e.g., color, shape, movement, identity, etc.) drops off with weaker illumination. Thus, it is important that target illumination flashlights be as bright as possible in order to minimize errors in weapon aiming and target recognition.

Comparatively large weapons such as, for example, carbines, rifles, shotguns and large cross-bows can generally accommodate a fairly bulky flashlight and still be conveniently handled. Hence, comparatively high intensity target illumination flashlights are available for such weapons. However, with smaller weapons, such as for example, pistols or small cross-bows, only a comparatively small flashlight can be accommodated without making the weapon unwieldy. Compact prior art flashlights for use with pistols or other small size weapons, have generally lacked the desired level of illumination intensity, i.e., they provide comparatively weak target illumination.

Thus, a need continues to exist for a compact flashlight which provides higher illumination intensity than has been previously available, or stated alternatively, a need continues to exist for a high intensity flashlight of smaller dimensions than has been previously available. Them is especially an ongoing need for a compact high intensity flashlight suitable for use with pistols. As used herein, the word "pistol" is intended to include any comparatively small hand-holdable aimable weapons, including but not limited to, revolvers, single-shot, semi-automatic and automatic pistols, small cross-bows, and dart and bolt launchers.

SUMMARY OF THE INVENTION

An improved flashlight is provided, comprising most generally, an elongated hollow body for holding at least three batteries arranged side-by-side, first electrical interconnection means coupled to first ends of the batteries and aligned thereto for electrically interconnecting first ends of a first pair of the batteries, and second electrical interconnection means coupled to second ends of the batteries for electrically interconnecting second ends of a second pair of the batteries. A lamp is conveniently coupled to the first electrical interconnection means, and in the preferred embodiment, is supported thereby.

In further detail, the first electrical connection means conveniently comprises a circuit board with a first electrical lead making contact to first ends of the first pair of batteries and a second electrical lead making contact to a first end of a third battery and a third electrical lead making contact to a trust electrically conductive portion of the body means. The second and third electrical leads are desirably coupled to electrical leads of the lamp. The second electrical connection means desirably comprises a circuit board with a fourth electrical lead making contact to second ends of the second pair of batteries and a fifth electrical lead making contact to a second end of one of the first pair of batteries and coupled to a second portion of the body means, preferably through a switch.

In a preferred embodiment, an alignment means is provided interior to the longitudinal body for holding at least one of the circuit boards and the batteries in predetermined relationship. Where minimum exterior body diameter is desired, the alignment means preferably comprises longitudinal grooves in the interior wall of the body into which the batteries are partially recessed. Peripheral portions of the circuit boards also engage the grooves. The grooves hold the batteries in a side-by-side arrangement and align the circuit boards with respect to the batteries so that the contacts on the circuit boards mate with the terminals on the batteries.

For target illumination, a standard size clamp conveniently attaches the compact flashlight to a weapon with the light emitting axis of the flashlight aligned with the boresight of the weapon. A remote switch is conveniently provided for turning the flashlight on and off while holding the weapon in the firing position.

BRIEF DESCRIPTION OF THE FIGURES

FIGS. 8 and 9 are transverse partial cross-sectional views similar to FIG. 4, but showing circuit boards of the type depicted in FIGS. 6-7 installed in the flashlight illustrated in FIG. 1;

FIG. 10 is a simplified longitudinal (side) view showing the manner of attachment of the flashlight of FIG. 1 to a weapon for target illumination;

FIG. 12 is a view similar to FIG. 10, but according to a further embodiment of the present invention;

FIGS. 13-15 are transverse cross-sectional views similar to FIG. 4 but showing alternative arrangements with larger numbers of batteries;

DETAILED DESCRIPTION OF THE PREFERRED EMBODIMENT

Figure 1:
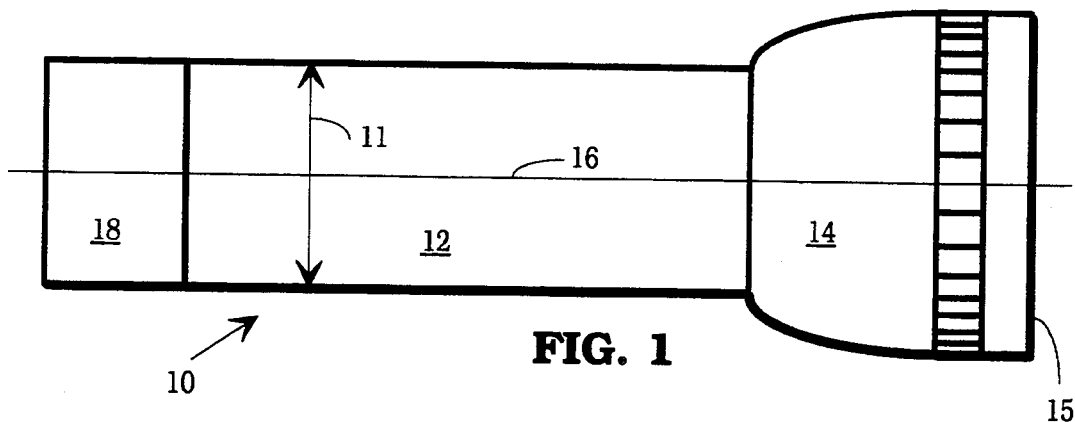
FIG. 1 is a longitudinal (side) view of a compact flashlight according to a preferred embodiment of the present invention.
Figure 2:
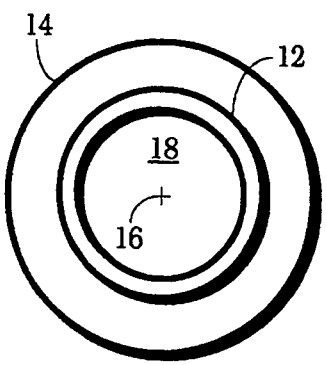
FIG. 2 is a left end view of the flashlight of FIG. 1.

FIG. 1 is a longitudinal (side) view of compact flashlight 10 according to a preferred embodiment of the present invention. Flashlight 10 comprises elongated body 12 of outside diameter 11 for containing batteries, head portion 14 for containing a lamp, mirror and window and/or lens 15 through which light is emitted in a beam parallel to longitudinal axis 16 of flashlight 10. Tail cap 18 attaches to body 12 at the end opposite head 14. Tail cap 18 conveniently contains an internal switch or connections to an external switch. FIG. 2 is a left end view of flashlight 10 looking toward tail cap 18 and axis 16.

Figure 3:
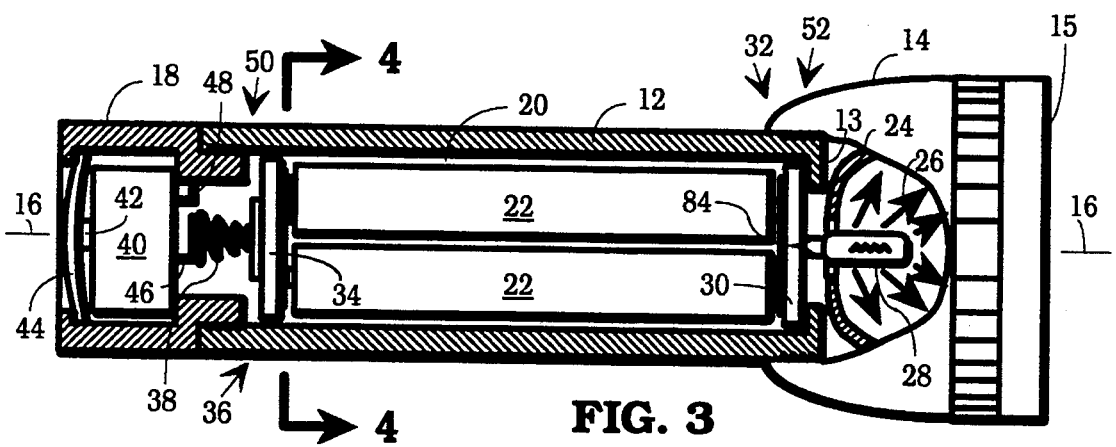
FIG. 3 is partial cross-sectional and cut-away longitudinal (side) view of the flashlight of FIG. 1.

FIG. 3 is partial cross-sectional and cut-away longitudinal (side) view of flashlight 10 of FIG. 1 showing details of its interior construction. Flashlight body 12 has interior bore 20 for containing multiple batteries 22 in side-by-side arrangement. Head 14 has therein generally parabolic mirror 24 which reflects light 26 from lamp 28 along axis 16 and out through window or lens 15 in the end of head 14.

Body 12 further comprises electrical interconnection means 30 adjacent first ends 32 of batteries 22 near head end 14 with lamp 28, and second electrical interconnection means 34 adjacent second ends 36 of batteries 22 near tail cap 18. Lamp 28 is electrically coupled to interconnection means 30 and, desirably attached to and/or supported thereby, although the latter is not essential. Spring 38 desirably presses against the outboard face of second interconnection means 34 so as to force second interconnection means 34, batteries 22 and first interconnection means 30 together so that proper electrical contact is achieved. First interconnection means 30 is retained by lip 13 of body 12.

Switch 40 is conveniently mounted in tail cap 18 when it is desired that flashlight be entirely self contained, but this is not essential. Switch 40 may be remote and have leads extending into tail cap 18. Switch 40 has one electrical lead 46 coupled to second interconnection means 34, e.g., through spring 38, and another electrical lead 48 coupled to interconnection means 30 and/or lamp 28. Where cap 18 and body 12 are of metal or otherwise have a conductive lining or lead, then lead 48 only need make contact with the nearby interior wall of cap 18 (or body 12) as shown, for example, in FIG. 3.

Cap 16, body 12 and head 14 are conveniently joined by threads at locations 50, 52, respectively, but any other convenient attachment means may also be used.

The details of the threads in locations 50, 52 are omitted for clarity. Where it is desired that flashlight 10 be substantially water resistant, then "O" rings or other gaskets are conveniently also provided at locations 50, 52, in the conventional manner. The threads at location 52 conveniently also serve to permit adjustment of the focus of the flashlight 10 by allowing head 14 with mirror 24 (and optional lens 15) to move axially relative to lamp 28 in the conventional manner.

Figure 4:
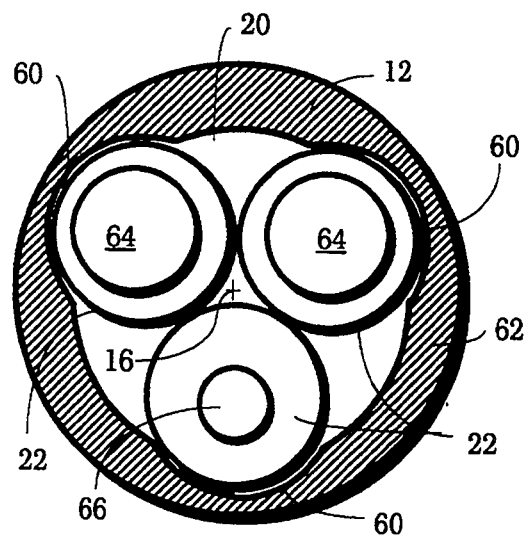
FIG. 4 is a transverse partial cross-sectional and cut-away view of the flashlight of FIG. 1, somewhat enlarged.

FIG. 4 is a transverse partial cross-sectional and cutaway view, somewhat enlarged, of flashlight 10 of FIGS. 1-3 at the location indicated on FIG. 3, and looking along axis 16. In the preferred embodiment of flashlight 10, three batteries 22 are provided within bore 20 of body 12. By providing longitudinal grooves or recesses 60 in sidewall 62 of body 12, three AAAA batteries 22 can be accommodated within bore 20 while maintaining outside body diameter 11 at 0.750 inches (19 mm). This is an important advantage since it allows flashlight 10 to be held in the same standard mounts already developed and in wide spread use for single and multi- AA cell target illumination flashlights having the same outside diameter. Such mounts have become a defacto standard for small weapon target illumination flashlights, and the compact flashlight of the present invention is much more useful because it fits into these same pre-existing mounts. Thus, weapon owners who desire to take advantage of the improved brightness of the compact flashlight of the present invention need not change the standard flashlight mounts that may already be installed on their weapons.

The ability to fit three AAAA batteries into body 12 makes it possible to achieve higher illumination intensity. By series connecting the three batteries, a higher operating voltage is obtained and a higher intensity bulb can be used. The higher intensity bulb provides greater illumination intensity. This objective is achieved in a flashlight whose exterior dimensions are substantially the same as a single AA cell flashlight, but whose illumination intensity is generally poorer because it must use a lower voltage lamp.

As shown in FIG. 4, two of batteries 22 are arranged with their larger negative poles 64 and one of their smaller positive poles 66 facing outward, i.e., toward end cap 18. At the other ends of the batteries, the situation is reversed, i.e., two positive poles 66 and one negative pole 64 face in toward head 14. However, batteries 22 may be inserted in the flashlight with either polarity orientation so long as they have, e.g., for a three battery bundle, a two-one arrangement, that is, at each end of the battery bundle there are two or poles of one polarity and one of the opposite polarity. Interconnection means 30, 34 make contact with the battery terminals and connect the batteries in series so as to yield the maximum voltage. Interconnection means 30, 34 are shown in greater detail in FIGS. 5-6. Interconnection means 30, 34 are conveniently in the form of printed circuit boards, i.e., insulating substrates 70, 72 on which are located metal leads or traces 74-78. Dashed lines in FIGS. 5-6 show the approximate locations of batteries 22 in relation to circuit boards 70, 72.

Figure 7:
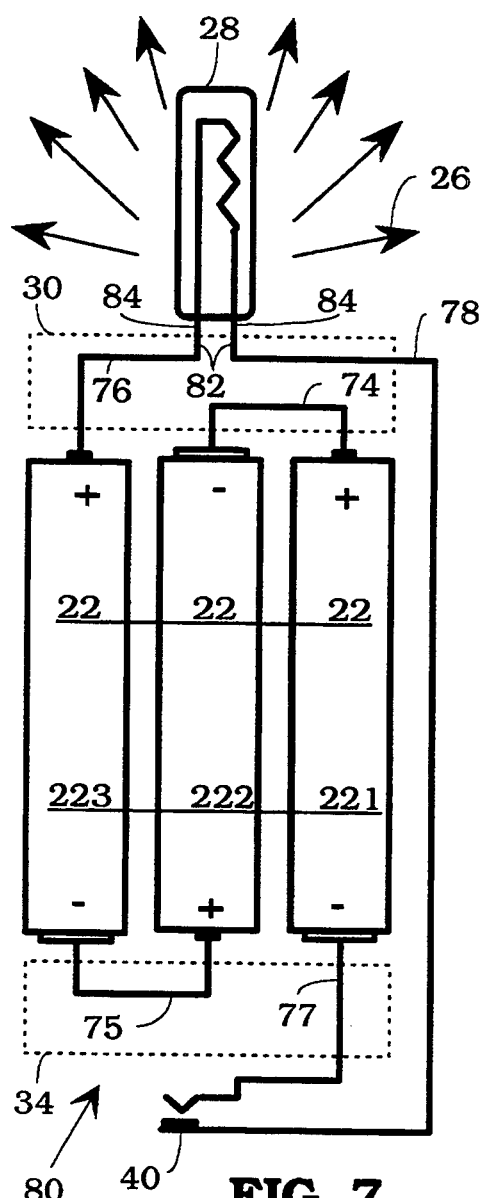

The electrical interconnection provided by interconnection means 30, 34 are shown in schematic circuit diagram 80 of FIG. 7. Metal lead interconnections 74-78 of circuit boards 70-72 are indicated on schematic 80, illustrating that first interconnection means 30 connects opposite polarity terminals of first pair of batteries 221-222 and interconnection means 34 connects opposite polarity terminals of second pair of batteries 222-223. One battery is common and one battery is different in each pair. Contacts (or openings for receiving the lamp leads) 82 on circuit board 70 connect to leads 84 of lamp 28 (see FIGS. 3, 5, 7).

Figure 6:
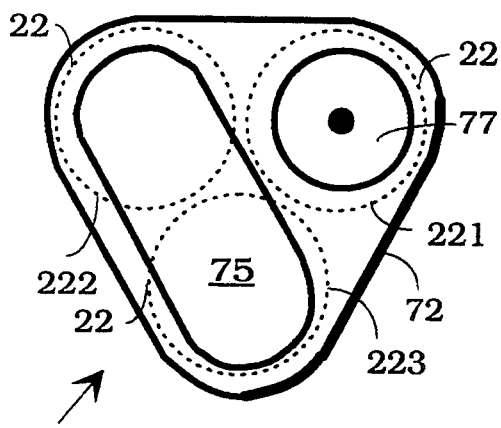
FIGS. 6 and 7 are plan views of electrical circuit boards and connections which are mounted interior to the flashlight of FIG. 1.
Figure 5:
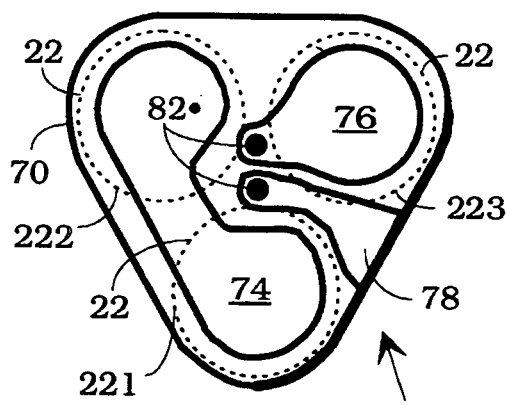
FIG. 5 is a simplified electrical circuit diagram of the flashlight of FIG. 1.

FIGS. 8 and 9 are transverse partial cross-sectional views similar to FIG. 4, but showing circuit boards of the type depicted in FIGS. 5-6 installed in body 12 of flashlight 10 approximately in location 32. Batteries 22 have been omitted in FIGS. 8-9 for clarity. Circuit boards 70 desirably have portions 61 which engage longitudinal grooves or recesses 60 in body 12 so as to align, for example, contacts 74, 76 in the correct azimuthal orientation around longitudinal axis 16 of body 12 (see FIGS. 1, 3-4). In this way, metal leads 74, 76 on circuit boards 70 align with and contact battery terminals 64, 66 (or vice-versa). By comparing FIGS. 4 and 8, it can be seen that grooves 60 align both the batteries and circuit boards in the correct mutual relationship. Lead 76 connects to one pole of a battery and to one electrode of lamp 28. Lead 78 connects to the other electrode of lamp 28 and is coupled to conductive body 12 through which the electrical circuit from the other pole of the series arranged batteries is desirably completed. For convenience of explanation, lead 78 is shown in FIGS. 8-9 as being on the same side of circuit board 70 as leads 74, 76, and extending to an edge so that it may easily wrap around to the opposite side of board 70 and contact lip 13 of body 12 when board 70 is inserted in body 12.. However, lead 78 may be located on the opposite side of circuit board 70 from leads 74, 76, i.e., on the same side as lip 13 of conductive body 12, without need for it to extend around the edge of board 70. The latter arrangement is preferred.

In the arrangement shown in FIGS. 4, 5-6 and 8, circuit boards 70, 72 and grooves 60 of body 12 have three-fold azimuthal symmetry, that is, circuit boards 70, 72 may be inserted in body 12 in any one of three azimuthal positions spaced 120 degrees apart around longitudinal axis 16. It does not matter how circuit board 70 is inserted in body 12 so long as batteries 22 and circuit board 72 are inserted with the proper polarities, e.g., a positive pole of a first battery and a negative pole of a second battery contacting metal lead 74 and a positive pole of the third battery contacting metal lead 74. When circuit board 72 is placed over the opposite ends of the batteries, the positive pole of the second battery and the negative pole of the third battery contacts metal lead 75 of circuit board 72, and the negative pole of the first battery contacts metal lead 77. It will be understood that all of the batteries can be turned around so that their polarities are reversed and an equivalent result obtained.

FIG. 9 is a view of circuit board 70 similar to FIG. 8, but illustrating the use of alignment key 86 and groove 88 to remove the three-fold symmetry. Alignment key 86 and groove 88 insure that circuit board 70 will fit into body 12 at only one azimuthal orientation. By placing mating alignment means 86, 88 slightly off-center so that they are not half-way between any two protrusions 61 and/or grooves 60, circuit board 70 fits into body 12 with a unique azimuthal orientation and a unique face-up or face-down orientation. That is, it will fit face-up but not face-down or vice versa. The use of alignment means 86, 88 also applies to circuit board 72. Those of skill in the art will also appreciate that having key 86 protrude into groove 88 is convenient but not essential. Further, the roles can be reversed, that is, having a protrusion or other shape in interior bore 20 of body 12 and a notch or other mating form in circuit board 70, 72, or a combination thereof. Any convenient means for determining a unique orientation of the circuit boards with respect to the batteries will serve.

Figure 11:
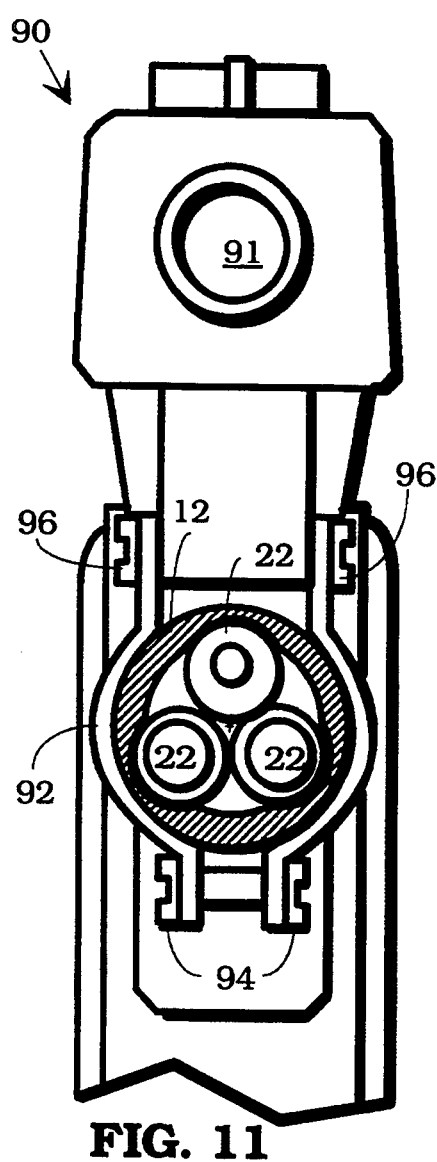
FIG. 11 is a simplified, transverse, cross-sectional view of the flashlight when mounted on the weapon, at the location indicated in FIG. 10.

FIG. 10 is a simplified longitudinal (side) view showing the manner of attachment of a flashlight 10 of FIG. 1 to weapon 90 for target illumination. Weapon 90 is conventional. Flashlight 10 is typically held under the barrel of weapon 90 by clamp 92 which engages body 12 of flashlight 10. FIG. 11 is a simplified, transverse, cross-sectional view through body 12 of flashlight 10 when mounted on weapon 90 of FIG. 10, looking toward muzzle 91 of weapon 90 and with batteries 22 exposed. Clamp 92 partially encircles body 12 and is held in place by, for example, screws 94, 96. Flashlight 10 is held so that light beam 98 is substantially aligned with weapon boresight and bullet trajectory 99. FIG. 12 is a view similar to FIG. 10, but according to a further embodiment of the present invention in which switch 40 is remote from tail cap 18, and is desirably mounted on front face 100 of weapon grip 102, e.g., by Velcro$^{tm}$ or adhesive or a combination thereof, and coupled to flashlight 10 by electrical leads 104. This arrangement allows flashlight 10 to be turned on and off while holding the weapon in its firing position.

FIGS. 13-15 are transverse cross-sectional views similar to FIG. 4 but showing alternative arrangements with larger numbers of batteries. Bodies 113-115 are analogous to body 12 discussed earlier but accommodating differing numbers of batteries. Body 113 of FIG. 13, accommodates four batteries 22, body 114 of FIG. 14 accommodates five batteries and body 115 of FIG. 15 accommodates seven batteries. If batteries of the same outer diameter as used in connection with FIGS. 1-12 as are used in the arrangements of FIGS. 13-15, then the outer diameters of bodies 113-115 must be correspondingly increased, for example, about in the ratios 3 to 3.5 to 4 to 4.5, for 3, 4, 5 and 7 cells, respectively. The length of the resulting flashlights remains substantially unchanged.

While FIGS. 13-14 show the use of longitudinal grooves 116 for aligning the batteries in side-by-side arrangement, this is not essential. For example, interior bore 120 of bodies 113-114 can be smooth, i.e., no grooves 116 as indicated by dashed circle 112 in FIGS. 13-14, but have centrally located star-shaped spine 117 in FIG. 13 and spine 118 in FIG. 14. Spine 117 has a four-pointed star shape with limbs that are curved to match the outer circumference of batteries 22, and spine 118 has a five-pointed star shape with similarly curved limbs. Spines 117, 118 are desirably attached or mate at one end to circuit board 70 with a predetermined azimuthal orientation so that when batteries 22 are inserted in the space between the inner bore 112 of body 12 or 120 and spines 117, 118, the poles on the ends of batteries 22 align with the contacts on circuit boards 70 in the same manner as has been previously discussed. At their other ends, i.e., remote from circuit board 70, spines 117, 118 desirably engage circuit board 72 to also fix its azimuthal orientation with respect to the spine and the batteries. While not shown in FIG. 15, a similar effect may be obtained by providing a hollow star-shaped spine. The battery lying on the axis is accommodated in the hollow core of the spine and radial protrusions on the spine fit into spaces between the surrounding batteries in much the same manner as shown for spines 117, 118.

Figure 16:
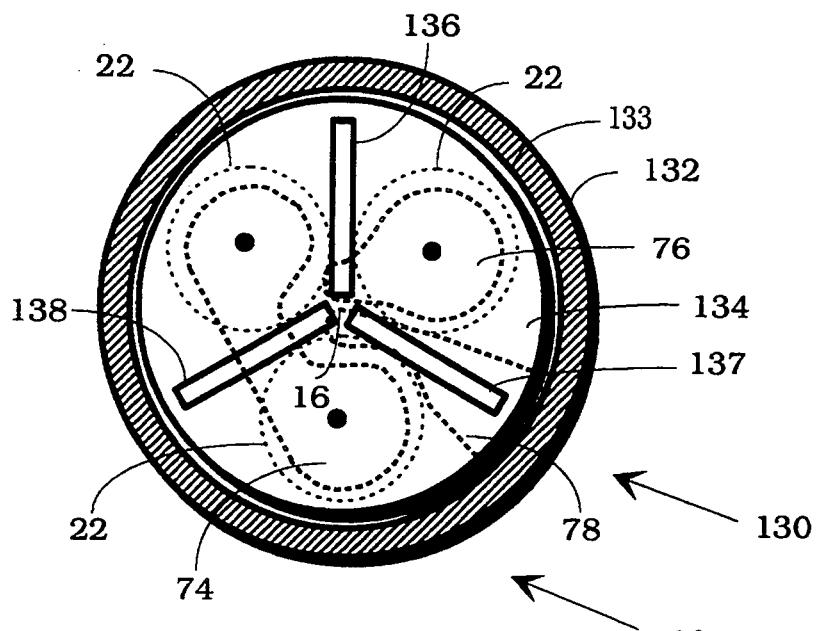
FIG. 16 is a transverse cross-sectional view similar to FIG. 4 but showing another embodiment of the present invention.
Figure 17:
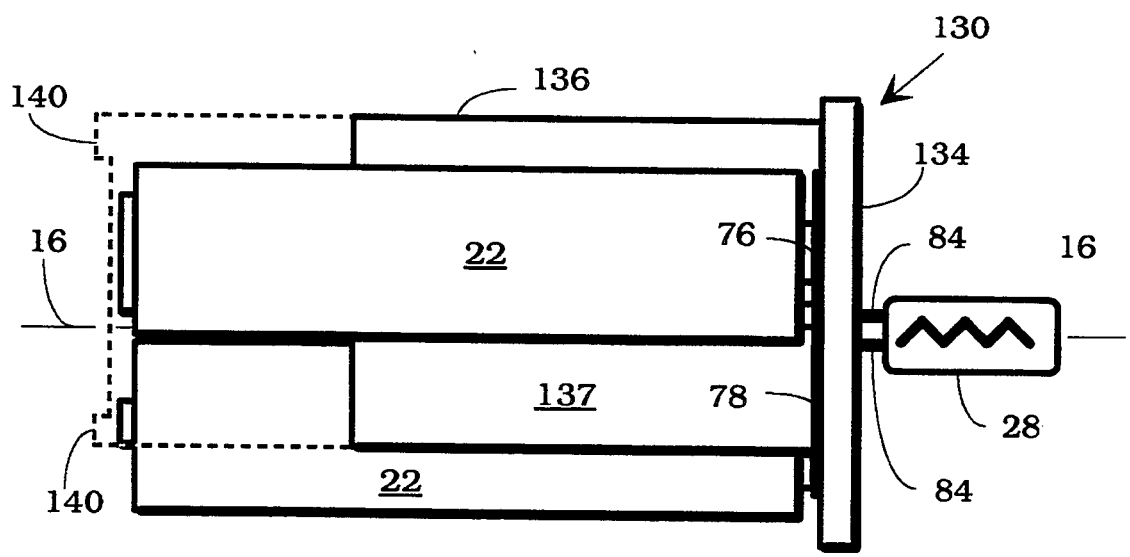
FIG. 17 is a longitudinal (side) view of the arrangement of embodiment of FIG. 16.

A further embodiment of the present invention is illustrated in FIGS. 16–17. FIG. 16 is a transverse cross-sectional view through body 132 (analogous to body 12) of flashlight 10. FIG. 16 is similar to FIG. 4 but showing a further embodiment of the present invention. FIG. 17 is a longitudinal (side) view of the arrangement of embodiment of FIG. 16, but with body 132 omitted for clarity.

Body 132 has a substantially cylindrical inner bore 133, that is, no longitudinal grooves are needed. Interconnection means 130 comprises circuit board 134 having thereon, for example, metal leads 74–78 similar to those shown in FIG. 4, and shown by the heavier dashed lines in FIG. 16. The location of the batteries 22 are shown by the lighter dashed lines in FIG. 16. Located between the batteries 22 and parallel thereto are wings or partitions 136–138 spaced 120 degrees apart around axis 16 of flashlight 10. Partitions 136–138 have a predetermined azimuthal orientation with respect to circuit board 134 and orient batteries 22 in side-by-side relationship parallel to axis 16 and with their end contacts in the correct relationship with respect to contacts 74–76 on circuit board 134. As shown in FIG. 17, partitions 136–138 may extend partially along the length of batteries 22 as indicated by the solid lines in FIG. 17, or may extend to the opposite ends of batteries 22, as indicated by the dashed lines. With the latter arrangement, they may engage the second circuit board (not shown) analogous to circuit board 72, so as to likewise fix its orientation with respect to the battery poles. This is easily accomplished, for example, by protrusion 140 on the ends of partitions 136–138 which engage matching slots or notches in the second circuit board. While partitions 136–138 are shown as being flat panels, this is not intended to be limiting, and a star-shaped spine such as has been illustrated in connection with FIGS. 13–14 may also be used. In either case, batteries 22 are constrained between inner bore 133 of body 132 and alignment means 136–138 which collectively align batteries 22, i.e., provide a side-by-side arrangement and the correct azimuthal orientation with respect to the electrical contacts on first interconnection means 130 at the head end of flashlight 10 and its counterpart at the other end of flashlight 10.

EXAMPLE

A flashlight accommodating three AAAA cells was constructed according to the teachings of the present invention, generally corresponding to the arrangement illustrated in FIGS. 1–7 and mounted on a weapon in much the same manner as shown in FIGS. 10–11. Body 12, head 14 and tail cap 18 were machined aluminum which screwed together, by means of an external thread on body 12 for accepting head 14 and an internal thread on body 12 for accepting tail cap 18, which pieces had mating threads. Body 12 had a length of about 2 inches (51 mm), an outer diameter of about 0.75 inches (19 mm), a wall thickness of about 0.09 inches (2.3 mm) between grooves 60 and about 0.035 inches (0.9 mm) over grooves 60. Thus, grooves 60 were about 0.055 inches (1.4 mm) deep and spaced at 120 degree intervals around the interior circumference of body 12. Body 12 had a clear interior bore of about 0.375 inches (9.5 mm) in diameter. Lip 13 at head end 32 of body 12 extended about 0.09 inches (2.3 mm) into the bore of body 12 so as to retain circuit board 70. Head 14 had a maximum outer diameter of about 1.0 inch (25.4 mm) and a length of about 1.215 inches (31 mm). Tail cap 18 conveniently had the same outer diameter as body 12 and a length (not counting the portion which engaged body 12) of about 0.55 inches (14 mm). When body 12, tail cap 18 and head 14 were assembled, flashlight 10 had an overall length of about 3.4 inches (86.4 mm). This is substantially the same outer body diameter and total length as for a conventional single AA cell flashlight.

Interconnection means 30, 34 were plastic impregnated fiberglass printed circuit (PC) boards about 0.062 inches (1.6 mm) thick and of a shape (in plan view) generally similar to that shown in FIGS. 5–6. Portions 61 of the outer perimeter of PC boards 30, 34, were shaped so as to engage grooves 60. Boards 70, 72 had thereon metal leads about 0.002 inches (0.05 mm) thick, generally of the shape (in plan view) shown in FIGS. 5–6 or substantial equivalent thereof. The metal leads on the PC boards were delineated in a conventional manner using masking and etching, but any other method for forming such leads may also be used.

The flashlight of the present invention was tested using two conventional type T1 bi-pin lamps, one xenon filled and another krypton filled, and suitable for use with three nominally 1.5 volt battery cells. Such lamps draw about 410–420 milliamps. Type T1 lamps are available from the Carley Lamp Co., Los Angeles, Calif. and other supplier well known in the art. Lamp leads 84 were conveniently inserted into connection holes 82 in PC board 70 and soldered to metal traces or leads 76, 78. Metal lead 76 also makes contact with one pole of a battery and metal lead 78 makes contact to conductive flashlight body 12 through lip 13. For convenience, lead 76 is located on one side of PC board 20 and lead 78 on the opposite side of PC board 20, i.e., the side that faced toward lip 13 when PC board 30 is inserted in body 12. This provides electrical contact between lead 78, lip 13 and metal body 12.

Lead 46 of switch 40 (see FIG. 3) made contact to second circuit board 72 and lead 48 of switch 40 made contact to the inner wall of cap 18, which when screwed into body 12, provided continuity between switch 40 and first circuit board 70 through metal body 12. Thus, the batteries, lamp and switch were arranged, by means of circuit boards 70, 72, cap 18 and body 12, to be electrically in series as shown in FIG. 5. Turning on switch 40 therefore activated lamp 28. Since batteries 22 were electrically in series the maximum available voltage was obtained from the batteries.

The illumination intensity obtained from the flashlight of the present invention when powered by the three AAAA cells arranged electrically in series using the above-described lamps was about 2.5 times greater than the illumination intensity obtained from a conventional two AA cell flashlight of the same nominal diameter but almost twice the length, and at least 5 times greater than a conventional one AA cell flashlight of the same nominal diameter and length. The one and two AA cell conventional flashlights used vacuum type bulbs drawing about 300–310 milliamps and of a voltage range suitable for use with the specified number of nominally 1.5 volt battery cells.

The xenon filled lamp gave the best illumination results with the present invention. However, because the xenon filled lamp generates more heat, it was found to be desirable to fabricate reflector 24 out of a heat resistant material when this type lamp was used. If ordinary metallized plastic reflectors were used, they softened when this lamp was left on for extended periods of time. Metal or metallized glass are examples of satisfactory heat resistant materials, although heat resistant metallized plastic are not precluded. The greater light intensity obtained from the flashlight of the present invention provides a significant improvement in performance without any increase in physical size of the flashlight. This is very desirable for target illumination applications.

Having thus described the present invention, it will be apparent to those of skill in the art based on the description herein that the present invention provides a compact flashlight that is no larger than a single AA cell flashlight of the prior art, but which provides at least about a five-fold increase in illumination intensity. Multiple batteries have been fitted into a case no larger than a prior art single-cell flashlight. Special circuit boards interconnect the batteries so that they are electrically in series (i.e., electrically end-to-end) even though they are physically arranged in parallel (i.e., physically side-by-side). This makes it possible to use a higher voltage, higher intensity bulb, thereby obtaining a brighter flashlight. By providing recesses in the walls of the flashlight body, the batteries are held in the side-by-side arrangement without having to increase the outer diameter of the flashlight body. The same recesses or grooves also serve to align the interconnecting circuit boards. This arrangement of elements provides important features not previously realized in prior art flashlights, i.e., the combined advantages of small size and higher illumination intensity.

Because of its compact size, the invented flashlight fits into standard accessory mounts used with hand-held weapons. By mounting the flashlight of the present invention in such a standard accessory mount, better target illumination is obtained without the expense of having to change the weapons accessory mount and with no increase in size or weight of the target illumination flashlight. This combination of features is very desirable in a flashlight for both general purpose uses and for target illumination uses.

Based on the description herein, many variations in design, construction and material selection will occur to those of skill in the art without departing from the spirit and scope of the present invention. For example, as has been illustrated, the means for aligning the batteries in side-by-side relationship and having their contacts and those on the electrical interconnection means line up, may be accomplished in a variety of ways, some of which are described herein, but others of which will occur to those of skill in the art based on these teachings. Further, while good results were obtained with three AAAA battery cells and high intensity xenon filled lamps, which combination is preferred, use of other size batteries and/or different numbers of battery cells and/or different lamps is not precluded. Accordingly, it is intended to included these and such other variations as will occur to those of skill in the art based on the description herein, in the claims that follow.

I claim:

1. A flashlight comprising:
   an elongated hollow body means for holding at least three batteries arranged side by side, said hollow body means comprising a single chamber having longitudinal grooves in an interior wall thereof, each groove being shaped to receive a portion of a different battery, said longitudinal grooves being equally spaced around said interior wall, said hollow body means having an exterior surface separated from said single chamber by a wall thickness which is smaller adjacent said longitudinal grooves and larger between said longitudinal grooves;
   first electrical interconnection means coupled to first ends of the batteries and aligned thereto for electrically interconnecting first ends of a first pair of the batteries; and
   second electrical interconnection means coupled to second ends of the batteries for electrically interconnecting second ends of a second pair of the batteries.

2. The flashlight of claim 1 further comprising a lamp coupled to said first electrical interconnection means.

3. The flashlight of claim 2 wherein the lamp is supported by the first electrical interconnection means.

4. A flashlight comprising:
   an elongated hollow body means for holding at least three batteries arranged side by side,
   first electrical interconnection means coupled to first ends of the batteries and aligned thereto for electrically interconnecting first ends of a first pair of the batteries;
   second electrical interconnection means coupled to second ends of the batteries for electrically interconnecting second ends of a second pair of the batteries; and
   a lamp coupled to said first electrical interconnection means;
   wherein the lamp is supported by the first electrical interconnection means, and the first electrical connection means comprises a first electrical lead making contact to the first ends of the first pair of batteries and a second electrical lead making contact to a first end of a third battery and a third electrical lead making contact to a first electrically conductive portion of the body means.

5. The flashlight of claim 4 wherein the second and third electrical leads are coupled to electrical leads of the lamp.

6. The flashlight of claim 4 wherein the second electrical connection means comprises a fourth electrical lead making contact to second ends of the second pair of batteries and a fifth electrical lead making contact to a second end of one of the first pair of batteries and coupled to a second electrically conductive portion of the body means electrically coupled to the first electrically conductive portion of the body means.

7. The flashlight of claim 6 further comprising a switch and wherein the fifth electrical lead is coupled to the second electrically conductive portion of the body means through a switch.

8. A flashlight comprising:
   an elongated hollow body means for holding at least three batteries arranged side by side,
   first electrical interconnection means coupled to first ends of the batteries and aligned thereto for electrically interconnecting first ends of a first pair of the batteries; and
   second electrical interconnection means coupled to second ends of the batteries for electrically interconnecting second ends of a second pair of the batteries; and
   wherein the body means has an interior bore with longitudinal recesses therein into which the batteries are partially received and which locate the batteries in substantially parallel, side-by-side, orientation; and
   wherein at least one of the electrical interconnection means comprises a thin circuit board having an exterior perimeter a portion of which engages at least one of the longitudinal recesses.

9. A flashlight comprising an elongated hollow body having an interior bore for accommodating multiple elongated batteries arranged side-by-side, said interior bore having therein multiple elongated grooves for receiving portions of the batteries;

first and second interconnection means located, respectively, adjacent first and second ends of the multiple batteries for making contact thereto; and said interconnection means engaging one or more of the grooves for aligning the batteries and the interconnection means in predetermined relationship.

10. A flashlight comprising an elongated hollow body having an interior bore for accommodating multiple elongated batteries arranged side-by-side;

first and second interconnection means located, respectively, adjacent first and second ends of the multiple batteries for making contact thereto; and alignment means interior to the hollow body and engaging at least one of said interconnection means for aligning the batteries in predetermined relationship thereto; and wherein the interconnection means comprise circuit boards having thereon electrodes which make electrical connection with end-mounted contacts of the batteries, wherein each circuit board has at least one electrode which interconnects the end-mounted contacts of at least one pair of batteries.

11. The flashlight of claim 10 wherein the first circuit board interconnects end-mounted contacts of a first pair of the batteries and the second circuit board interconnects end-mounted contacts of a second pair of the batteries, different by at least one battery from the first pair of the batteries.

12. A target illumination device, comprising:

a lamp for providing light;

an elongated barrel having a wall of varying thickness and having a single central chamber internal to said wall for receiving at least three batteries having opposed end-contacts, wherein the batteries are arranged within said central chamber in a side-by-side configuration and partially recessed into equally spaced grooves formed in said wall, wherein said wall is thinner proximate each of said grooves and thicker between each of said grooves;

a switch for interrupting the flow of current from the batteries to the lamp; and interconnection means proximate to first and second ends of the barrel and electrically coupled to the lamp and the switch for interconnecting the end contacts of the multiple batteries to arrange the batteries electrically in series with each other, the switch and the lamp, so that closing the switch causes the lamp to illuminate.

13. A target illumination device, comprising:

a lamp for providing light;

an elongated barrel for receiving at least three batteries having opposed end-contacts, wherein the batteries are arranged in a side-by-side configuration;

a switch for interrupting the flow of current from the batteries to the lamp; and interconnection means proximate to first and second ends of the barrel and electrically coupled to the lamp and the switch for interconnecting the end contacts of the multiple batteries to arrange the batteries electrically in series with each other, the switch and the lamp, so that closing the switch causes the lamp to illuminate; and wherein the interconnection means comprise a first board with conductive leads thereon, the conductive leads making electrical connection to the end contacts of the multiple batteries; and wherein the lamp is attached to two of the electrically conductive leads on a first of the circuit boards.

14. A target illumination device, comprising:

a lamp for providing light;

an elongated barrel for receiving at least three batteries having opposed end-contacts, wherein the batteries are arranged in a side-by-side configuration;

a switch for interrupting the flow of current from the batteries to the lamp; and interconnection means proximate to first and second ends of the barrel and electrically coupled to the lamp and the switch for interconnecting the end contacts of the multiple batteries to arrange the batteries electrically in series with each other, the switch and the lamp, so that closing the switch causes the lamp to illuminate; and wherein the interconnection means comprise a first board with conductive leads thereon, the conductive leads making electrical connection to the end contacts of the multiple batteries; and wherein a first terminal of the switch is coupled to an electrically conductive lead on a second circuit board and a second terminal of the switch is coupled to a conductive portion of the elongated barrel.

15. A target illuminating weapon, comprising:

a target illuminating flashlight comprising, (i) a rigid elongated barrel having in the interior thereof a single chamber having equally spaced grooves therein for holding at least three elongated batteries arranged in a side-by-side equally spaced relationship, (ii) a lamp mounted proximate to an end of the elongated barrel for emitting a light beam aligned along the weapon boresight, and (iii) circuit means interior to the barrel for electrically interconnecting end contacts of the elongated batteries so as to connect them electrically in series with each other and the lamp, the circuit means engaging the grooves so as to align the circuit means and the batteries in the predetermined relationship;

attachment means engaging the elongated barrel and the weapon for aligning a light emitting axis of the flashlight with the boresight of the weapon; and switch means coupled to the weapon for completing an electrical circuit comprising the series arranged batteries and lamp.

16. A flashlight, comprising:

(i) a rigid elongated barrel having in the interior thereof a single chamber having grooves therein substantially equally spaced around said interior for holding at least three elongated batteries in a predetermined side-by-side relationship substantially equally spaced around said interior;

(ii) circuit means interior to the barrel for electrically interconnecting end contacts of the elongated batteries so as to connect them electrically in series with each other and a lamp, the circuit means engaging the grooves so as to align the circuit means and the batteries in the predetermined relationships; and (iii) switch means for completing an electrical circuit comprising the series connected batteries and lamp.

17. A flashlight, comprising:
(i) a rigid elongated barrel having in the interior thereof a single chamber having grooves therein for holding at least three elongated batteries in a predetermined side-by-side relationship;
(ii) circuit means interior to the barrel for electrically interconnecting end contacts of the elongated batteries so as to connect them electrically in series with each other and a lamp, the circuit means engaging the grooves so as to align the circuit means and the batteries in the predetermined relationships; and
(iii) switch means for completing an electrical circuit comprising the series connected batteries and lamp, wherein the circuit means comprises a first circuit board adjacent first ends of the elongated batteries and a second circuit board adjacent second ends of the elongated batteries, wherein at least one of the circuit boards comprises a printed circuit board.

* * * * *